United States Patent [19]

Kawasaki et al.

[11] Patent Number: 5,524,571
[45] Date of Patent: Jun. 11, 1996

[54] METHOD FOR SYNTHESIZING COMPOUND SEMICONDUCTOR POLYCRYSTALS AND APPARATUS THEREFOR

[75] Inventors: Akihisa Kawasaki; Toshihiro Kotani, both of Osaka, Japan

[73] Assignee: Sumitomo Electric Industries, Ltd., Osaka, Japan

[21] Appl. No.: 478,016

[22] Filed: Feb. 9, 1990

Related U.S. Application Data

[63] Continuation of Ser. No. 213,483, Jun. 30, 1988, abandoned, which is a continuation of Ser. No. 813,743, Dec. 26, 1985, abandoned.

[30] Foreign Application Priority Data

Dec. 28, 1984 [JP] Japan ................... 59-278834
Dec. 29, 1984 [JP] Japan ................... 59-281270

[51] Int. Cl.⁶ ................................ C30B 15/02
[52] U.S. Cl. ................ 117/213; 117/17; 117/18; 117/30; 117/33
[58] Field of Search ............... 422/249; 156/605, 156/607, 617.1, 618.1, 619.1; 261/122, 97; 117/17, 18, 30, 33, 213

[56] References Cited

U.S. PATENT DOCUMENTS

| | | | |
|---|---|---|---|
| 3,198,606 | 8/1965 | Lyons | 422/249 |
| 3,642,452 | 2/1972 | Roget et al. | 261/122 |
| 3,716,345 | 2/1973 | Grabmaier | 422/249 |
| 3,791,813 | 2/1974 | Ramachandran et al. | |
| 3,799,523 | 3/1974 | Brant et al. | |
| 4,097,329 | 7/1978 | Stock et al. | 156/617.1 |
| 4,118,447 | 10/1978 | Richter | 261/122 |
| 4,478,675 | 10/1984 | Akai | 156/605 |
| 4,750,969 | 7/1988 | Sassa et al. | 156/607 |

FOREIGN PATENT DOCUMENTS

| | | | |
|---|---|---|---|
| 2117030 | 7/1972 | France . | |
| 2175595 | 10/1973 | France . | |
| 2142388 | 7/1972 | Germany | 156/605 |

OTHER PUBLICATIONS

Chemical Abstracts vol. 90, No. 18, Apr. 1979, Abstract No. 144976d.
Freyhardt, editor, "Crystals", vol. 3 III-V Semiconductors, Sringer-Verlag, New York, 1980 pp. 54-55.
Farges, "A Method for the In-Situ Synthesis and Growth of Indium-Phosphide", Journal of Crystal Growth, 59(1982) pp. 665-668.

Primary Examiner—Robert Kunemund
Attorney, Agent, or Firm—Jones, Tullar & Cooper

[57] ABSTRACT

Herein disclosed are apparatuses for manufacturing compound semiconductor polycrystals comprising a pressure vessel, an upper shaft, a container for a first component fixed to the upper shaft, a heater around the container, a lower shaft, a susceptor and a crucible for charging a second component, a heater for the crucible and a communicating pipe for spatially connecting the container and the crucible optionally provided with a porous member at the lower extremity and/or a cylindrical member for confining a space over a part of the melt surface contained in the crucible from the remaining inner space of the vessel, the apparatuses permitting the substantial reduction of the reaction time and an improvement of the yield of the polycrystals due to the presence of the porous member and/or the cylindrical member separating the inner space of the vessel into two portions.

4 Claims, 5 Drawing Sheets

METHOD FOR SYNTHESIZING COMPOUND SEMICONDUCTOR POLYCRYSTALS AND APPARATUS THEREFOR

This is a continuation of application Ser. No. 07/213,483 filed on Jun. 30, 1988, now abandoned, which is a continuation of application Ser. No. 06/813,743, filed Dec. 26, 1985, now abandoned.

BACKGROUND OF THE INVENTION

1. Field of the Invention

The present invention relates to a method for synthesizing semiconductor polycrystals, in particular, polycrystals of III–V or II–VI compound semiconductors and an apparatus therefor, and more particularly the present invention relates to a method for manufacturing compound semiconductor polycrystals, which makes it possible to synthesize them in a high yield and a remarkably reduce time for obtaining the polycrystals and to an apparatus efficient to carry out the process.

2. Description of the Prior Art

Recently, there has been a marked tendency, in semiconductor technology, to require semiconductor devices capable of high speed and high frequence applications. To achieve such improvement in semiconductor devices, various kinds of compound semiconductors such as gallium arsenide (GaAs) belonging to the III–V compound semiconductors, have drawn great attention, because of their high electron mobilities which help to minimize series resistances and their high saturation drift velocities which result in increased cutoff frequencies. Thus, research for improving the quality of compound semiconductor materials, for example, the III–V compound semiconductor such as gallium arsenide (GaAs), and indium phosphide (InP) and the II–VI compound semiconductor such as cadmium selenide (CdSe), the zinc sulfide (ZnS) has extensively been carried out and their quality have been improved day by day, and further devices made from such compound semiconductors have also been greatly improved in their quality.

These compound semiconductors are generally utilized to manufacture light emitting devices such as semiconductor lasers and elements receiving such light useful in the field of optical-fiber communication, field effect transistors (FET), or other sensors, and these semiconductors have been expected to permit the substantial improvement in physical qualities of these devices.

To manufacture these compound semiconductor devices, single crystals of high purity are generally required. For this purpose, various methods for preparing single crystals of compound semiconductors have been proposed such as the liquid encapsulated Czochralski technique (LEC technique), the horizontal or vertical Bridgman technique, or other improved methods thereof, and as a result single crystals having excellent properties have been obtained.

When preparing compound semiconductor single crystals, first of all it is necessary to form polycrystalline material thereof and then the polycrystalline material must be used as the starting material for obtaining single crystals. Such polycrystalline material may be prepared by reacting two different elements. However, the preparation of polycrystals of compound semiconductors is generally considered to be very difficult, since they are composed of elements having a high dissociation pressure (in other words, low decomposition temperature), for instance, phosphorus (P) and arsenium (As) of the group V elements, cadmium (Cd) of the group II elements, sulfur (S) of the group VI elements or the like. The presence of such elements of high dissociation pressure makes the preparation procedures quite complex and it is difficult to obtain a polycrystalline compound semiconductor having precise stoichiometry.

In this connection, a method for synthesizing polycrystalline compound semiconductors will now be explained on the basis of the synthesis of an (InP) polycrystal. This is generally carried out according to the gradient freeze method which comprises encapsulating indium (In) and phosphorus as the starting elements in a quartz ampoule at desired regions spaced apart from each other, horizontally placing the ampoule in an apparatus provided with two independent heaters arranged around the apparatus in line with the longitudinal axis thereof, adjusting the power of the heaters to establish a desired temperature distribution (having a certain gradient) in the apparatus along its horizontal direction so that the temperature of the region in which the phosphorus is present becomes low, and then changing the relative position of the ampoule with respect to the heaters so that the indium reacts with the phosphorus vapour which moves toward the indium in the ampoule to form the (InP) polycrystal.

However, the crystal growth temperature of the (InP) is around 1060° C. when the (InP) polycrystals are formed according to the gradient freeze method and at that temperature, the vapour pressure of phosphorus at the dissociation equilibrium is as high as 27.5 atm. and therefore, the stoichiometric polycrystals of (InP) cannot be obtained. Further, the segregation coefficient of indium during the synthesis of (InP) polycrystal largely deviates from 1 and as a result the indium content in (InP) polycrystal manufactured according to the method mentioned above is quite low at the initial stage of the polycrystal synthesis. On the contrary, the content of the indium in (InP) crystal is quite high at the final stage, thus the resulting polycrystal has a concentration gradient in which the content of indium increases along the crystal growing direction. Therefore, the extremity of the crystal in the vicinity of, the end point of the synthesis is extremely rich in indium concentration, which cannot be used as the starting material for obtaining the single crystal of (InP) and, in general, the extremity thereof is previously removed by fusing that portion prior to use as the starting material for single crystal preparation.

The method for manufacturing compound semiconductor polycrystals has now been explained referring to the case of (InP). However, the same disadvantages as those accompanied by (InP) preparation are generally encountered in preparing other compound semiconductors, in particular, those including a high vapour pressure component such as mentioned above.

Under such circumstances, there is proposed a new method for preparing polycrystals in which LEC puller is used, instead of the gradient freeze method. The apparatus has been used for preparing single crystals of compound semiconductors which comprises introducing a melt of a starting material into a crucible which is rotatively supported; disposing the crucible in a furnace in which a desired temperature distribution is established; immersing a seed crystal in the melt, which is fixed on a lower end of a rotative rod or shaft; pulling the rod while rotating the crucible and the seed crystal in opposite directions to grow single crystals. In this method, the melt of ingredient is covered with a liquid encapsulant and nitrogen gas or argon gas is introduced in the crystal growing chamber at a high pressure to prevent the escape of the component of high dissociation pressure. Thus, this method is referred to as the liquid encapsulated Czochralski (LEC) method.

The LEC growing apparatus per se is, in general, used for growing single crystals. However, the apparatus is provided with a vessel capable of bearing high pressure, heaters, upper and lower axis (shafts) which may rotate and move up and down, a susceptor or the like and the apparatus is considered to be useful to synthesize polycrystals of compound semiconductors. Thus, J. P. Farges has already proposed a method for preparing (InP) polycrystals utilizing such an LEC apparatus (See, J. Crys. Growth, 1982, 59, 665–668).

In this method, red phosphorus as the starting material for phosphorus is gasified and the resulting phosphorus vapour is bubbled into a melt of indium to react with each other. However, the phosphorus vapour bubbled in the indium melt reacts with indium only partially and the unreacted gaseous phosphorus escapes into the space of a growing furnace (or a pressure vessel) through a liquid encapsulant layer. As a result, the space of the growing furnace is filled with phosphorus vapour and it is often observed that the part of the phosphorus vapour is deposited on the wall of a pressure vessel. In addition, the deposition of phosphorus vapour is also observed on a sight through window and therefore, the control or monitor of the conditions for crystal growing cannot be effected sufficiently.

According to the inventors' experiences, the yield of (InP) polycrystal prepared by the method explained above is as low as 80% and therefore, the efficiency of this method is not so high. In other words, the amount of phosphorus required to completely convert one mole of indium to (InP) is equal to at least 1.5 moles and thus, all the indium may be recovered as (InP) if the synthesis of (InP) is carried out under the presence of phosphorus in an amount 1.5 times larger than that required to satisfy the stoichiometry. The method according to J. P. Farges is less economical, this is because a third of the amount of phosphorus does not take part in the (InP) synthesis and is discharged into the space of the pressure vessel without being consumed to form the (InP) polycrystal.

Moreover, in the method, the reaction of phosphorus with indium melt is carried out by introducing the vapour of phosphorus into the melt in the form of bubbles having a relatively large radius and as a result, the reaction area (or contact frequency between a phosphorus atom and an indium atom) is quite low, and therefore, the method needs a substantially long period of time to complete synthesis of the (InP) polycrystal and therefore, it is industrially unfavorable.

BRIEF EXPLANATION OF THE INVENTION

A principal object of this invention is to provide an improved LEC apparatus for synthesizing compound semiconductor polycrystals.

Another object of the present invention is to provide an apparatus for synthesizing compound semiconductor polycrystals, permitting the improvement in yield of the product with respect to the starting materials used.

A further object of this invention is to provide an apparatus for synthesizing compound semiconductor polycrystals, permitting a remarkable reduction of reaction time and a substantial increase in yield of the polycrystalline products.

A still further object of this invention is to provide a method for manufacturing compound semiconductor polycrystals effectively used as a starting material for single crystals which is important as a substrate for making electronic elements or devices, the method permitting the synthesis of compound semiconductor polycrystals excellent in their stoichiometry which present no concentration gradient along the growing direction of the crystal, which constitutes a severe problem in the conventional methods.

The problems encountered in the conventional methods are such that the reaction efficiency is quite low when a high vapour pressure element is bubbled into a melt of low vapour pressure and as a result most of the elements introduced into the melt of low vapour pressure component in the form of bubbles are discharged to the space of a pressure vessel without taking part in the reaction, and that it takes a very long period of time required to complete the synthesis of polycrystals, because of the low contact area between reactants during bubbling the high vapour pressure component in the melt, as already explained above. Thus, the present invention addresses the problems associated with the conventional method for manufacturing compound semiconductor polycrystals and overcomes these problems effectively by increasing the contact area between reactants i.e., between the gaseous component of the high vapour pressure element and the melt of the low vapour pressure, and that in order to improve the reaction efficiency and yield thereof, it is important to reduce the radius of bubble or to increase the area from which the bubbles are delivered into the melt.

The above mentioned and other objects of this invention can be accomplished by providing a growing apparatus having the following construction, which permits the improvement in reaction yield and reaction time and makes it possible to carry out the synthesis of compound semiconductor polycrystals, more effectively.

According to an aspect of this invention, an apparatus for manufacturing compound semiconductor polycrystals is provided, which is an improved LEC apparatus and comprises a pressure vessel; a lower shaft which is rotative and capable of moving up and down and which extents within the pressure vessel through the bottom thereof; a susceptor fixed to and supported by the lower shaft at its upper end within the pressure vessel; a crucible for receiving the melt of a starting material having a low dissociation pressure, disposed in the susceptor; a heater disposed so as to surround the side wall and the bottom of the crucible; an upper shaft inserted through the top of the pressure vessel and capable of rotating and moving up and down; a container for a high vapour pressure element fixed to and suspended by the upper shaft at the lower extremity thereof in the pressure vessel; a heater placed around the external wall of the container; a communicating pipe assuring the communication between the container and the crucible and a porous member engaged with the lower end of the communicating pipe.

According to another aspect of the present invention, another apparatus for manufacturing compound semiconductor polycrystals is provided and comprises a pressure vessel; a lower shaft inserted in an air tight manner into the interior of the pressure vessel through the bottom thereof and capable of rotating and moving up and down; a susceptor and a crucible fixed to and supported by the lower shaft at its top end; a heater placed so as to surround the side wall and the bottom of the crucible; an upper shaft inserted in an air tight manner into the inner space of the pressure vessel through the top wall thereof and capable of rotating and moving up and down; an outer cylindrical member having a closed head and supported and suspended by the upper shaft at its lower end; an inner cylindrical member coaxially supported by the outer cylindrical member, having a closed head, the inner cylindrical member forming an annular channel for transporting the gaseous component of the polycrystal together with the outer cylindric member; a container receiving the starting material, for gaseous component, having high vapour pressure disposed on the head of the inner cylindrical member; and a heater placed around the container for heating and gasifying the starting material contained therein.

These apparatuses can effectively be used to carry out the method of manufacturing compound semiconductor polycrystals according to the present invention. The method comprises bubbling gases of a first component having a high vapour pressure in a melt of a second component, in a sealed pressure vessel under a high pressure, to react them and to form the polycrystals, characterized by covering a part of the melt surface with an enclosure to isolate the space over the melt surface from the inner space of the pressure vessel, while covering the remaining surface of the melt with a liquid encapsulant to prevent the high vapour pressure component (the first component) from dissociation and evaporation and carrying out the gas bubbling process so that a part of the gaseous first component unreacted is delivered into the isolated space.

According to the apparatus and the method of the present invention, the disadvantages associated with the conventional methods for manufacturing compound semiconductor polycrystals can effectively be eliminated and polycrystals having excellent properties can efficiently be provided.

BRIEF DESCRIPTION OF THE DRAWINGS

The apparatuses and the method for synthesizing compound semiconductor polycrystals according to the present invention will be understood in more detail in the light of the following explanation described with reference to the following attached figures in which:

FIG. 4b shows the same diagram as shown in FIG. 4a, the apparatus shown corresponding to a modification of the apparatus shown in FIG. 4a.

DETAILED EXPLANATION OF THE INVENTION

Figure 1:
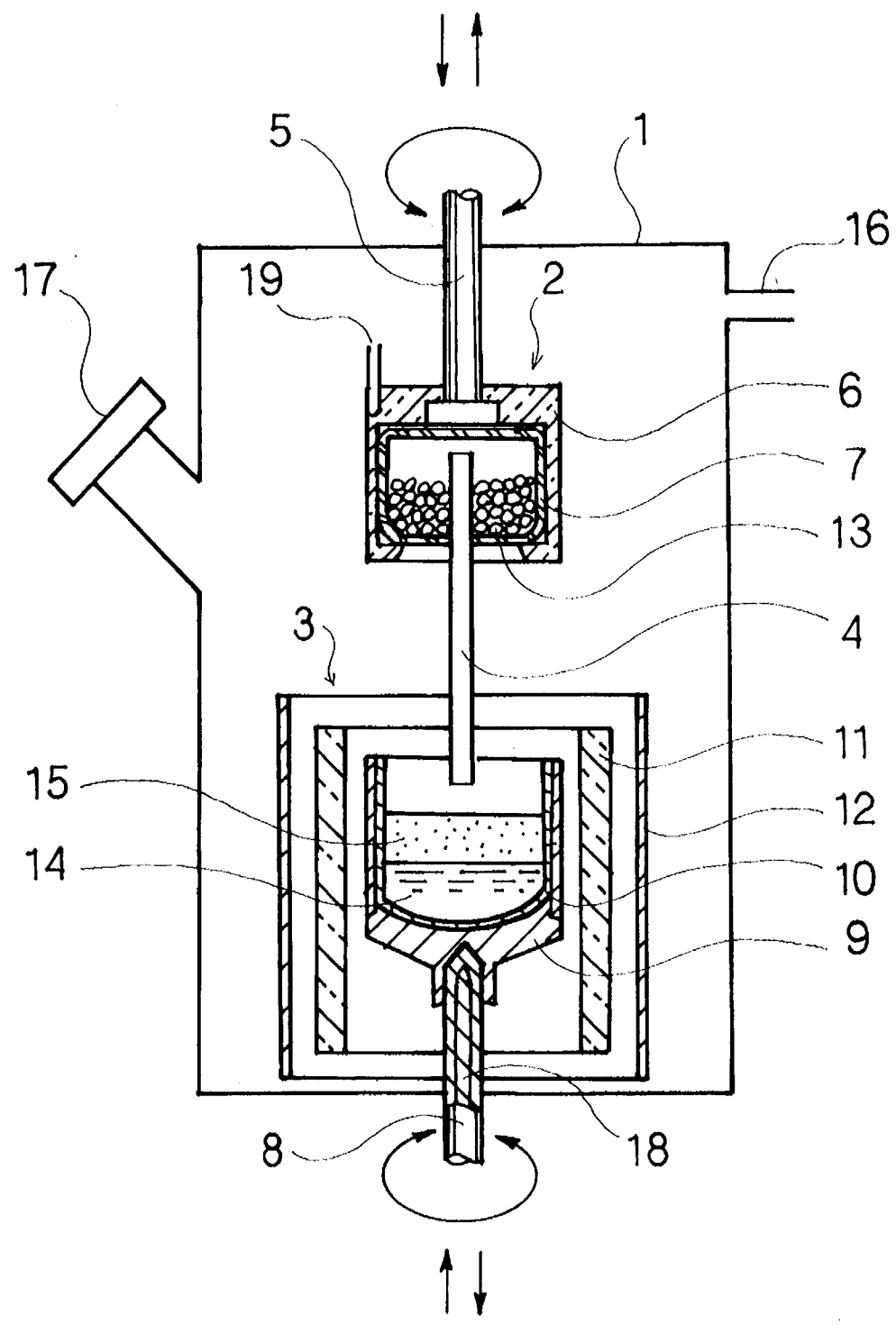
FIG. 1 is an illustrative vertical sectional view of the LEC apparatus which is used in the method proposed by J. P. Farges.

First of all, referring to attached FIG. 1, there is disclosed an illustrative vertical sectional view of the LEC apparatus used in the method for manufacturing compound semiconductor polycrystals, proposed by J. P. Farges. As shown in FIG. 1, the LEC apparatus principally comprises a pressure vessel 1, a system 2 for generating gases of a first component of the polycrystal having a high pressure at dissociation equilibrium, a system 3 for containing a melt of a second component and a communicating pipe 4 spatially connecting the system 2 and the system 3.

The system 2 for generating the gases of the first component, more particularly, comprises a shaft 5 inserted in a airtight manner in the vessel 1 through the head thereof and capable of rotating and moving up and down; graphite holder 6 supported by the shaft 5 and suspended at the upper portion in the pressure vessel 1, and an ampoule 7 for containing the first component, surrounded and supported by the graphite holder 6.

On the other hand, the system 3 for containing the melt of the second component, more particularly, comprises a lower shaft 8 inserted in an airtight manner into the vessel 1 through the bottom thereof, a susceptor 9 and a crucible 10 supported by and fixed to the lower shaft 8 at its top portion, a heater 11 placed so as to surround the side wall of the crucible 10 and a cylindrical barrier 12 disposed outside the heater 11.

The systems 2 and 3 are in communication through a communicating pipe 4 which extends in the ampoule 7 through the bottom thereof and extends downward toward the crucible 10, so that the gases of the first component 13 generated within the ampoule 7 may be introduced into the melt 14 of the second component contained in the crucible 10 in the form of bubbles.

Hereunder, the procedures for forming compound semiconductor polycrystals will be explained according to the preparation of indium phosphide polycrystal as an example using the apparatus shown in FIG. 1. Red phosphorus 13 as the ingredient of the first component is first introduced into the ampoule 7 while the communicating pipe 4 is inserted into the ampoule 7 through the bottom thereof, fitting the ampoule 7 to the holder 6, while introducing solid indium (the second starting material) into the crucible 10 and further introducing solid encapsulant such as $B_2O_3$ thereon and placing the crucible 10 at the desired position within the pressure vessel 1. At this stage, a gas such as argon (Ar) is introduced through a gas inlet 16 disposed at the upper portion of the vessel wall so that the pressure in the vessel is equal to about 60 atm. After the establishment of a constant pressure (60 atm) in the vessel 1, the vessel 1 is sealed in an airtight condition, the heater 11 is operated to melt the solid indium and $B_2O_3$ and then the upper shaft 5 is moved downward until the lower part of the communicating pipe 4 is sufficiently immersed into the melt 14 of indium. Thereafter, the upper and lower shafts 5 and 8 are moved down simultaneously while maintaining a constant relative distance between the shafts (or the distance between the ampoule 7 and the crucible 10; for instance, 150 mm), until the ampoule 7 is influenced by the heater 11. Thus, the red phosphorus 13 is gasified and the gases generated is introduced into the melt 14, through the communicating pipe 4, in the form of bubbles to cause reaction between the gaseous phosphorus and the indium melt and consequently to form (InP) polycrystal.

In this case, the position of the ampoule 7 may be changed by moving the upper and lower shafts 5 and 8 upward or downward to adjust the temperature of the ampoule 7. Thus, the temperature may suitably be adjusted within the range of from 400° to 700° C. so that the rate of sublimation of the solid phosphorus and the amount of gaseous phosphorus can be controlled. Such control may be manually effected while monitoring the bubbling conditions through a sight through window. In addition, the melt may be agitated by rotating the lower shaft 8 during the reaction to increase the retention time of the bubbles in the melt and the contact time between the gaseous phosphorus and the indium melt to improve the yield of (InP) polycrystal. Moreover, the temperature of the melt 14 in the crucible 10 and the red phosphorus in the ampoule 7 may be detected by thermocouples 18 and 19 respectively and in proportion to the temperature detected, the upper and lower shafts 5 and 8 are moved up or down to adjust the temperature thereof.

However, many problems such as mentioned above are accompanied by the method for manufacturing compound semiconductor polycrystals utilizing LEC apparatus as shown in FIG. 1. First, the gaseous phosphorus generated in the ampoule 7 is introduced into the melt 14 through the communicating pipe 4 in the form of bubbles having a relatively large radius and as a result it is impossible to assure a sufficient residence, time of the bubbles in the melt or a sufficient contact area between the gaseous phosphorus and the molten indium even if the melt is agitated by rotating the crucible. This, in turn, results in the escape of a large amount of unreacted phosphorus gases which are discharged through the encapsulant layer 15 into the space within the vessel 1. The presence of the layer of encapsulant 15 makes it possible to prevent the molten indium and the resulting (InP) polycrystal in the liquid state from decomposing and escaping, while it is impossible to prevent the gaseous phosphorus from its dissipation even if the encapsulant layer is present over the melt. Moreover, the bubble may possibly entrain the resulting (InP) when it is discharged into the space of the vessel 1 through the encapsulant layer. Thus, the efficiency of the method becomes extremely low and it is at most 80% as already mentioned before.

Alternatively, the amount of phosphorus used may be increased to improve the yield. However, phosphorus must be used in an amount at least 1.5 times larger than the stoichiometric amount thereof to completely convert molten indium to (InP) polycrystal and therefore, such an increment of the amount of phosphorus makes the method less economical. This further means that the inner space of the vessel 1 is filled with a large amount of phosphorus gas, which possibly causes the formation of deposits on the wall of the vessel and the reduction of transparency of the sight through window. This, in turn, makes control of the reaction impossible or difficult.

Furthermore, in the method, an extremely long reaction time is required because of the low contact time and area between the molten indium and the gaseous phosphorus as well as the low rate of reaction.

From the results mentioned above, the method proposed by J. P. Farges, as a whole, is less economical and less efficient and is not sufficient to adopt to industrially produce polycrystals of compound semiconductors having excellent properties and should be improved.

PREFERRED EMBODIMENTS OF THE INVENTION

The conventional method utilizing LEC apparatus is not sufficient for industrially producing polycrystals of compound semiconductors economically and efficiently, due to various kinds of difficulties originated from the presence of elements having a high vapour pressure (or dissociation pressure). However, the problems encountered in the conventional methods can effectively be solved completely by applying an apparatus for synthesis, hereunder, explained in more detail with reference to the accompanying drawings.

Figure 2:
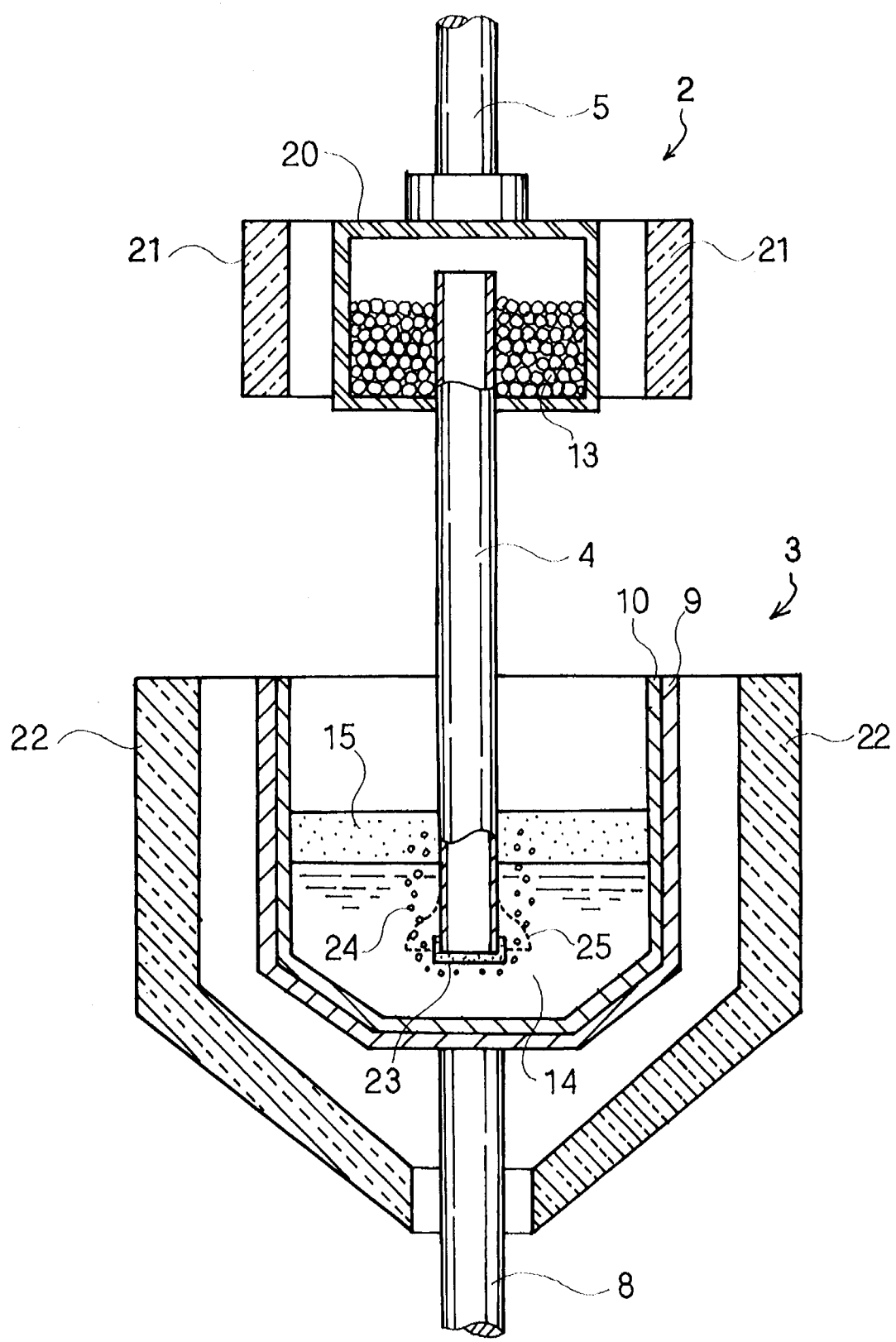
FIG. 2 shows an illustrative vertical sectional view of the apparatus for manufacturing polycrystals according to a preferred embodiment of this invent ion.

Referring now to the attached FIG. 2, a preferred embodiment of the apparatus according to the present invention is shown as an illustrative vertical sectional view thereof. In this figure, the pressure vessel and connections thereof are omitted for the sake of simplicity and to the same elements as those shown in FIG. 1 the same reference numerals are assigned so that the construction of the apparatus may easily be understood. In this embodiment, the system 2 for generating gases of a first component having a high vapour pressure (low dissociation temperature), for instance, group V or VI elements such as phosphorus (P), arsenic (As), antimony (Sb), sulfur (S), selenium (Se), tellurium (Te) comprises an upper shaft 5, a container 20 for receiving the first component 13, supported and suspended by the upper shaft 5 and a heater 21 for heating the first component 13, placed around the container 20. While the system 3 for containing melt of the second component, for example, group III or II element such as gallium (Ga), indium (In), aluminium (Al), zinc (Zn), cadmium (Cd) comprises a lower shaft 8, a susceptor 9 and a crucible 10 supported by the lower shaft 8 and a heater 22 which serves to heat the melt 14 comprising the of second component having a relatively low dissociation pressure, such as gallium or indium and a liquid encapsulant 15 such as $B_2O_3$. The systems 2 and 3 are communicated through a communicating pipe 4 which extends within the container 20 through the bottom, thereof and further extends downward towards the crucible 10 so that the lower part of the communicating pipe 4 is sufficiently immersed into the melt 14 of the second component during synthesizing polycrystals, and the gases generated in the container 20 is bubbled in the melt 14 therethrough. In addition, the apparatus according to the present invention is provided with a porous cap member 23 at the lower extremity of the communicating pipe 4 so that sufficient amount of bubbles 24 having quite a small radius may be delivered to the melt 14.

As materials for realizing the container 20 and the communicating pipe 4, pyrolyric boron nitride (PBN), boron nitride (BN), quartz or carbon coated with (BN) may be mentioned. The porous cap 23 may preferably be prepared from quartz, (PBN), (BN), carbon, aluminium nitride (AlN) silicon nitride ($Si_3N_4$). Furthermore, the susceptor 9 may be obtained from, for example, carbon and as the heaters 21, 22 any conventional heaters may be used, such as carbon resistance heating means and other known means for heating, for example, radiation heating means such as lamp heater, laser heater and optionally induction heating means may also be used.

In this apparatus, a cylindrical barrier may be disposed around the heater 22 to prevent the heat from dissipating as in the case shown in FIG. 1.

The gaseous material sublimated from the solid element (first component) 13 is also bubbled in the melt 14 of the second component through the communicating pipe 4 in the apparatus for synthesizing polycrystals having a construction as shown in FIG. 2. In this case, however, the radius of the bubbles delivered into the melt through the pipe 4 is extremely small compared with that of the bubbles generated in the LEC apparatus proposed by J. P. Farges. Therefore, the contact area (or time) is extremely increased and thus the degree of conversion of the starting materials can also be improved to a great extent. This further results in the reduction of the amount of the gaseous first component which is delivered, through the encapsulant layer, in the space of the vessel without causing reaction. The reduction of the amount of phosphorus unreacted and delivered into the space of the vessel makes it possible to economize the method for manufacturing compound semiconductor polycrystals. In addition, only a few or no deposit of phosphorus is formed on the wall of the vessel as well as on the sight through window and therefore, it can be possible to maintain the accuracy of the monitor of the reaction according to the apparatus of this invention.

According to a modification of the embodiment shown in FIG. 2, the diameter of the communicating pipe 4 at its lower extremity and the vicinity thereof may be enlarged (see dotted line 25) so as to substantially increase the bubble delivery area and to improve the degree of conversion. The porous cap may, of course, be used in this case.

Figure 3:
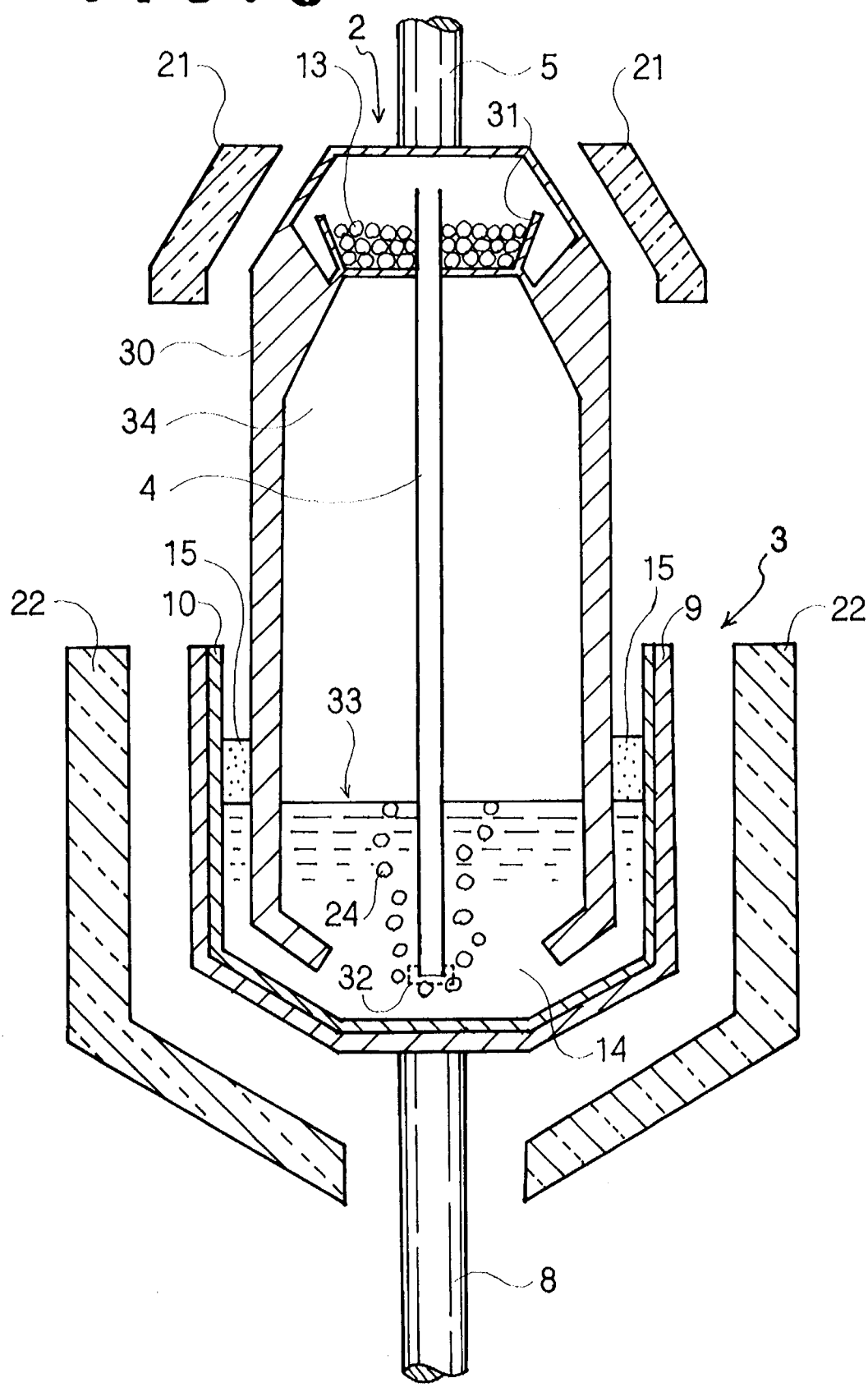
FIG. 3 shows an illustrative vertical sectional view of the apparatus for manufacturing polycrystals, which is a variation of the apparatus according to the invention, shown in FIG. 2.

Referring to FIG. 3, a variation of the embodiment shown in FIG. 2 is illustrated. In this variation, a part of the melt surface is confined by a cylindrical member 30 having an outer radius smaller than the inner radius of the crucible 10. The cylindrical member 30 and the inner radius of the crucible 10 form a space covering most of the melt surface and isolated from the remaining inner space of the pressure vessel 1. The cylindrical member 30 is provided with a container 31 for receiving a first component within the upper wall thereof and the communication between the container 31 and the melt 14 can be assured by the communicating pipe 4 as in the cases mentioned above. The other construction of the apparatus according to this embodiment is identical to those of the embodiment shown in FIG. 2 and therefore, the explanation thereof is omitted by assigning the same reference numerals as before for the sake of simplicity.

The cylindrical member 30 may preferably be a sleeve extending downward from the side wall of the container.

In this embodiment, a porous cap may also be fitted to the lower end of the communicating pipe 4 (see the dotted line 32 in FIG. 3), however, it is not necessary to use such a porous cap member in all cases. In this embodiment, a part of the melt surface 33 of the second component is not covered with the encapsulant but is contained within the cylindrical member 30 which confines the space 34 over the part of the surface and separate the space 34 from the remaining inner space of the vessel. Therefore, at beginning of the synthesis, a part of the first component does not take part in the reaction and maintained in the confined space 34. However, the gaseous first component in the space 34 is in direct contact with the melt surface at its interface 33 so that the first component once delivered in the gas phase 34 again reacts with the melt of the second component or is resolubilized into the melt if the vapour pressure in the space 34 exceeds the equilibrium pressure and thus the loss of the first component can effectively be prevented. In this embodiment, therefore, it is preferred to cover the surface of the melt 14, as much as possible, by the cylindrical member 30, while the volume of the space covering the melt surface defined by the cylindrical member should be minimized as small as possible. In this embodiment, the lower end of the communicating pipe 4 may be enlarged in its diameter and provided with a porous cap member at that portion so as to enlarge the area from which the bubbles are delivered in the melt.

In this embodiment, the encapsulant should not exist on the surface to be covered with the cylindrical member 30, therefore, careful attention must be paid when materials for the second component 14 and the liquid encapsulant 15 are introduced into the crucible 10. The charging of these materials may be effected by, for instance, introducing the second component into the crucible 10 and then deeply inserting the cylindrical member 30 in the second component prior to introducing the liquid encapsulant which is packed into the space formed between the inner wall of the crucible 10 and the outer surface of the cylindrical member 30, finally operating the heater 22 to melt these materials. It is, therefore, preferable to select the encapsulant having a specific gravity lower than that of the second component so as to effectively prevent the encapsulant from penetrating into the cylindrical member and forming an encapsulant layer on the melt surface to be covered with the member 30. The way to introduce the materials into the crucible is not limited to that mentioned above and any other methods capable of establishing the intended surface state may be applied.

Such being the case, ($B_2O_3$) is selected as the encapsulant to synthesize polycrystals of compound semiconductors such as indium phosphide (InP), gallium phosphide (GAP), gallium arsenide (GaAs), indium arsenide (InAs), cadmium telluride (CdTe) or zinc sulfide (ZnS), while the eutectic of NaCl and KCl is used for the synthesis of compound semiconductor polycrystals such as gallium antimonide (GaSb), indium antimonide (InSb), indium arsenide (InAs), gallium arsenide (GaAs), cadmium telluride (CdTe), gallium phosphide (GAP) or indium phosphide (InP).

Figure 4A:
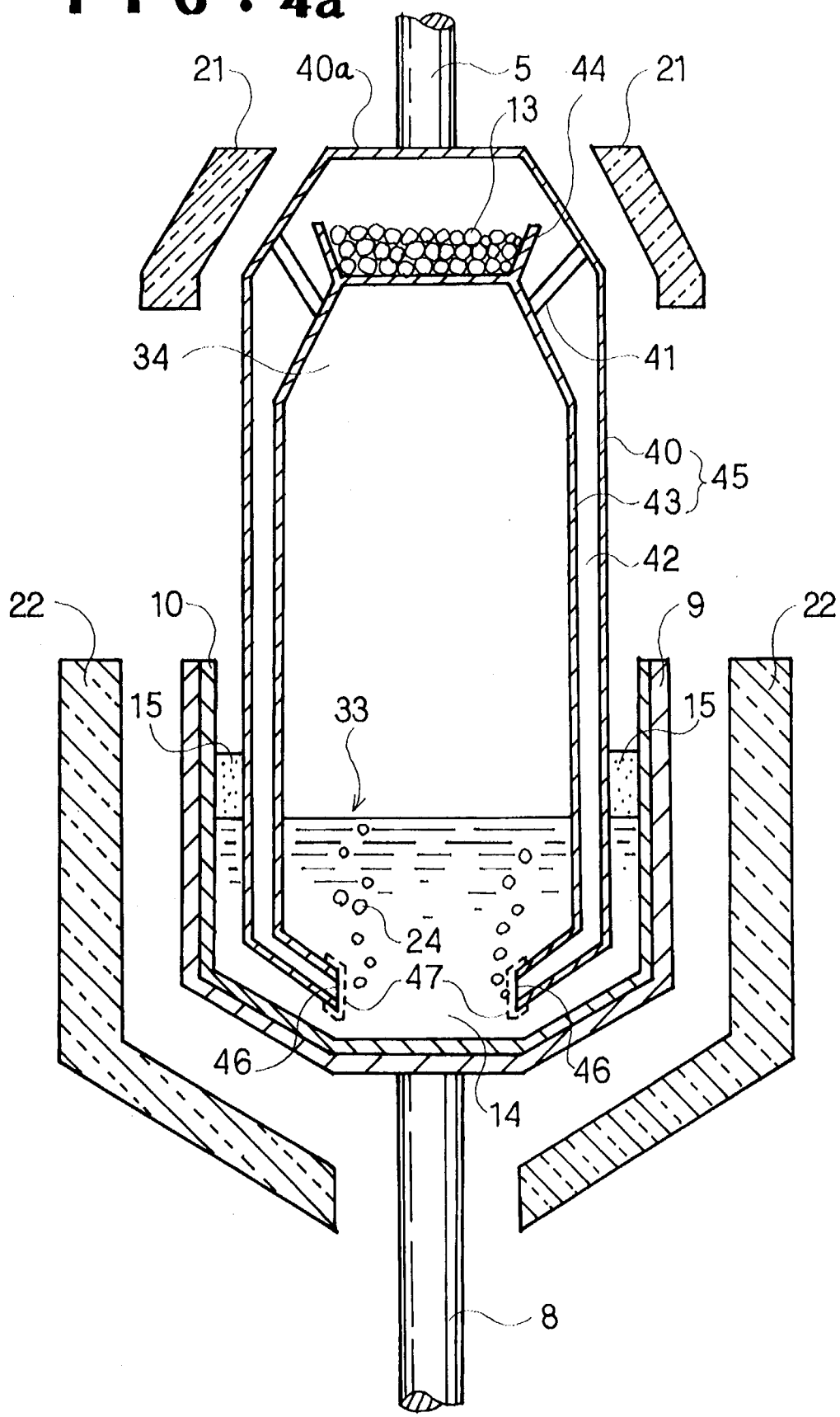
FIG. 4a is an illustrative diagram showing a vertical sectional view of the apparatus according to another preferred embodiment of this invention.
Figure 4B:
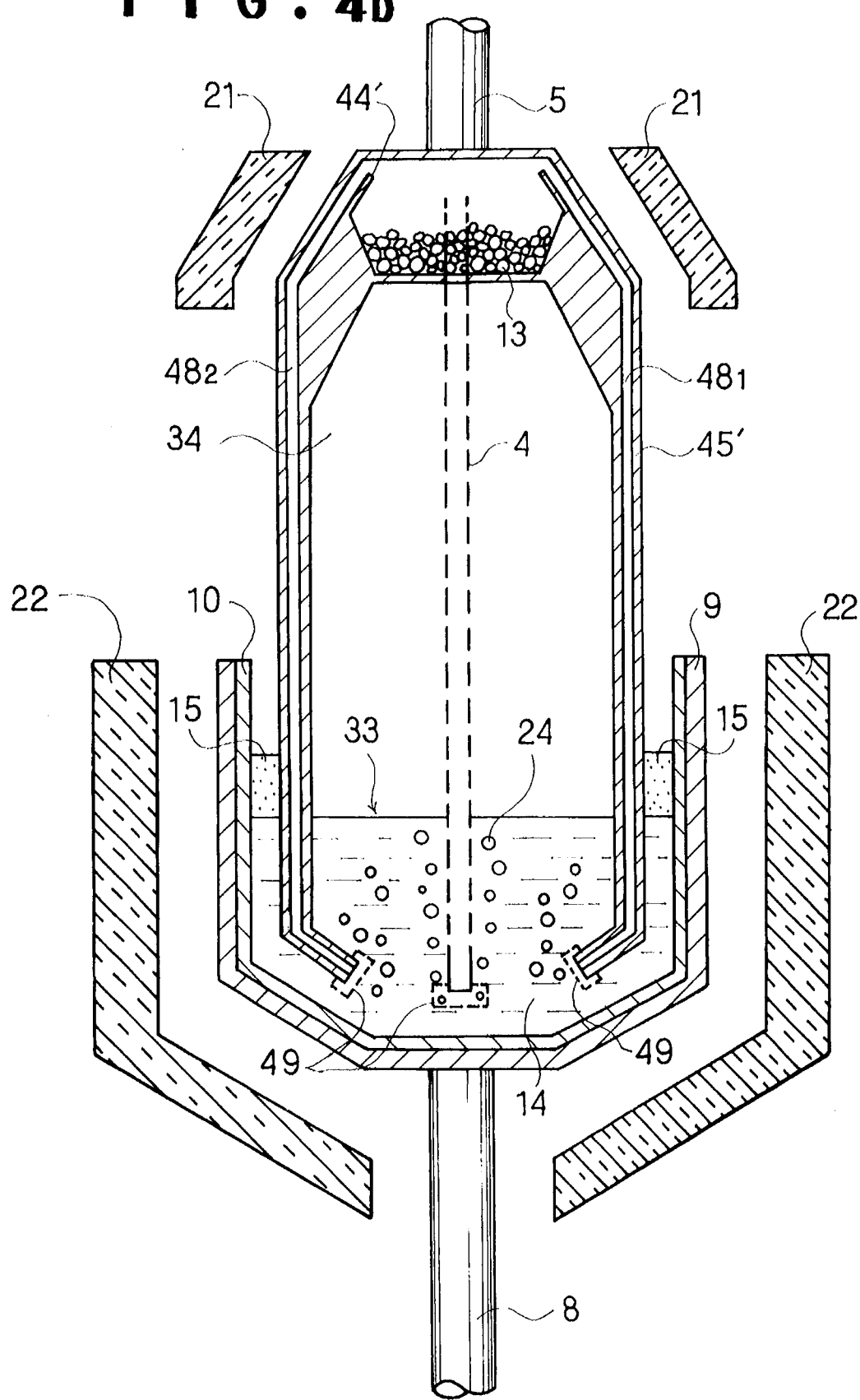

Referring to FIGS. 4a and 4b, two variations of a further embodiment of the apparatus according to the present invention are shown. The embodiment shown in FIG. 4a comprises a first cylindrical member (outer cylinder) 40 supported and suspended, in the vessel, by an upper shaft 5 and having a closed head, second cylindrical member (inner cylinder) 43 coaxially fixed to and supported by the outer cylinder 40 through supporting members 41 and forming, together with the outer cylinder 40, an annular channel 42 between them, which serves as the flow path of the gaseous first component 13, and a container 44 for receiving the first component, disposed on the top of the inner cylinder 43 so as to project towards the top wall of the outer cylinder 40. The assembly comprised of the outer and the inner cylinders arranged coaxially and provided with a built-in container 44 is hereunder referred to as a double cylinder structure 45 which corresponds to an assembly constructed by integrating the communicating pipe 4 and the cylindrical member 30 in the embodiment shown in FIG. 3. In this example, the gaseous first component 13 sublimated from the container 44 is introduced into the melt 14 of the second component through the annular channel 42 and delivered in the melt from the open-ended lower extremity 46 of the double cylinder structure 45, as bubbles 24.

In this embodiment, the double cylinder structure 45 may also be provided with an annular porous cap member (shown in FIG. 4a as dotted line 47) at the open-ended lower extremity 46. However, such a porous member is not necessarily disposed for the same reason as already explained in the description of the embodiment shown in FIG. 3. According to this embodiment, an extremely large area for delivering bubbles can be assured and therefore, it is expected to greatly improve the degree of conversion in the polycrystals manufacturing process. The introduction of materials of the second component 14 and the encapsulant 15 into the crucible 10 may also be carried out, in this case, according to the same approach as already mentioned before to explain the embodiment shown in FIG. 3. Therefore, careful attention should be paid to prevent the formation of encapsulant layer on the melt surface covered or the penetration of the encapsulant in the melt, the surface of which is confined by the inner cylinder 43.

The open-ended lower extremity 46 and the vicinity thereof should be inclined towards the central axis of the double cylinder structure 45 and the open-ended extremity 46 should faced the central axis so that the bubbles 24 is surely delivered toward the space 34 and not toward the remaining space of the vessel through the encapsulant layer 15.

In the apparatus shown in FIG. 4a, the flow path for transporting the gaseous first component 13 from the container 44 to the melt 14 of the second component must not be limited to that shown in FIG. 4a (the channel 42 formed within the double cylinder structure 45), and may also be realized by integrating the inner and outer cylinders as shown in FIG. 4b, forming at least one hole ($48_1$, $48_2$ ...) in the wall of the cylinder integrated 45' to assure the communication between the container 44 and the melt 14. Furthermore, a combination of the annular channel formed in the double cylinder structure or the holes and a communicating pipe 4 such as shown in FIGS. 2 and 3 may also be effective to synthesize polycrystals of compound semiconductors (see, FIG. 4b). It is a matter of course that a porous cap member may be disposed at the lower extremity of the pipe 4 and/or the holes $48_1$, $48_2$ ... in the embodiment.

Referring now to the method for synthesizing compound semiconductor polycrystals according to the present invention, it may, for example, be carried out utilizing the apparatus shown in FIG. 4a. In this case, a lid (not shown) disposed around the top wall 40a of the outer cylinder 40 is first opened to introduce the first component 13 into the container 44. While the solid second component is introduced into the crucible 10, then the lower portion 46 of the double cylinder structure 45 is deeply inserted into the solid component. At this stage, the solid encapsulant 15 is charged within the space formed between the crucible 10 and the outer cylinder 40.

Then, the pressure vessel 1 is sealed in an airtight manner, evacuated to high vacuum and then an inert gas such as $N_2$, Ar is introduced into the vessel to establish a high pressure of, generally, several tens of atmospheric pressure and this pressure is maintained during the synthesis. It must be noted, at this stage, that the inert gas is also charged into the space 34 and the channel 42 through the interstices between the particulate materials and that the pressure equilibrium between the space of the vessel and the space confined by the inner cylinder 43 is surely established.

Thereafter, the materials of the second component and the encapsulant contained in the crucible 10 are melted by heater 22 for heating melt wherein the encapsulant having a melting point higher than that of the second component is preferably used to effectively prevent the penetration of the encapsulant into the inner cylinder. Then, the first component is evaporated or sublimated by heating it with heater 21 to start a reaction between the first and second components. The gaseous first component generated within the container reaches the melt of the second component through the annular channel 42. The bubbles of the first component delivered in the melt gradually ascend up to the interface 33 between the melt and the space 34, during which a part of the first component reacts with the second component to form polycrystals while the remaining unreacted first component is thereafter discharged into the space 34 of the inner cylinder 43 through the interface 33. The gaseous first component discharged into the space 34 again reacts with the molten second component at the interface 33. Moreover, if the partial pressure of the first component in the space 34 exceeds the equilibrium value, it is also expected that the gaseous first component is redissolved in the melt and causes a reaction to form polycrystals. Therefore, the degree of conversion as well as the reaction rate are remarkably improved according to the method of this invention. During the reaction, the melt may be agitated by rotating shaft 8 or the shafts 5 and 8 in the opposite directions and thereby the reaction rate is further improved.

The resulting compound semiconductor polycrystalline product is maintained in the state of melt since the temperature of the crucible is maintained more than the melting point of the product. At this stage, the product is possibly decomposed and generates gases of group V element, however, the evaporation thereof into the space 34 is effectively restricted because of the high vapour pressure (partial pressure) thereof, while the escape of the gases to the remaining space in the vessel is also restricted due to the presence of the encapsulant layer.

The problem of decomposition or evaporation of the product or group V elements is also encountered when the double cylinder structure is pulled out from the melt after the completion of the synthesis, however, the liquid encapsulant spreads over the whole surface of the melt immediately after the withdrawal of the double cylinder structure from the melt and completely covers the melt surface to prevent the decomposition of the product and/or evaporation of the group V elements.

The method according to the present invention is explained using the apparatus shown in FIG. 4a, however, it is clear to those skilled in the art that the method can be carried out, using other apparatuses, according to the same manner as described above.

According to the method of this invent ion, it can generally be possible to recover compound semiconductor polycrystals in a high yield of at least 90%, to economize the amount of group V element used, for instance, in the case of phosphorus, about 30% of the amount thereof, can be saved, compared with the conventional methods. Moreover, the reaction rate can also be reduced remarkably. For example, if the same amount of a specific compound semiconductor polycrystal is prepared, the reaction time required can be reduced to less than ⅓ according to the method of this invention, with respect to that required in the conventional methods.

The present invention will further be explained in the light of practical examples given below.

EXAMPLE 1

In this example, the apparatus shown in FIG. 2 was used and (InP) polycrystal was prepared from indium and red phosphorus according to the method of this invention. The amount of the starting materials and the encapsulant used were as follows:

| | |
|---|---|
| In | 1,500 g |
| P (Red phosphorus) | 430 g |
| $B_2O_3$ (encapsulant) | 120 g |

After charging the starting materials and encapsulant into a crucible, nitrogen gas was introduced into a pressure vessel to establish the inner pressure of 60 atm. and the pressure was maintained at this value during the synthesis. (In) and ($B_2O_3$) were then heated until molten by heater 22 up to 1065° C. and held at that temperature. Then, the system 2 for generating the gaseous first component (red phosphorus) was lowered together with the communicating pipe by moving the upper shaft downward until the lower extremity of the pipe was immersed deep enough in the melt to ensure a substantial contact time or retention time of the bubbles in the melt.

Then, the heater 21 for heating red phosphorus was operated to cause sublimation of the red phosphorus. The red phosphorus was first heated quickly up to 350° C., held at that temperature for a while, then slowly heated to 550° C. and this temperature was maintained during the synthesis of the InP polycrystal.

Thus, (InP) polycrystal was obtained in the amount of 1905 g (yield: 98.7%)

EXAMPLE 2

In this example, the apparatus shown in FIG. 4a was used for synthesizing (InP) polycrystal as in Example 1. The amount of the materials used were as follows:

| | |
|---|---|
| In | 1,500 g |
| P (Red Phosphorus) | 405 g |

At first, solid (In) was charged into the crucible 10, then the upper shaft 5 was moved downward to sufficiently insert the lower extremity of the double cylinder structure and the vicinity thereof in the solid (In) contained in the crucible 10 and ($B_2O_3$) as the encapsulant was charged into the space between the outer wall of the double cylinder structure and the inner wall of the crucible. While red phosphorus was introduced in the container therefor before evacuating the pressure vessel and $N_2$ gas was charged into the vessel to establish the pressure of 60 atm. Then, the heater 22 was run to heat the (In) solid and the encapsulant ($B_2O_3$) and the temperature was raised to 1065° C. to melt them and held the that temperature during the reaction.

Then, operating the heater 21, red phosphorus was first quickly heated to 350° C. and slowly heated up to 550° C., finally maintained at this temperature to cause a reaction between the (In) melt and the gaseous phosphorus which was bubbled into the melt through the annular channel.

Thus, InP polycrystal was recovered in the yield of 99.7% (1900 g). In this reaction, the amount of red phosphorus which did not take part in the reaction was 5 g.

From the results obtained in the foregoing examples, it is concluded that the loss of the starting material, in particular, element having high decomposition pressure can be extremely reduced according to the present invention. That is to say, the yield of the product is only 80% in the conventional method, while according to the method and apparatuses of this invention, the yield is almost equal to 100%. Moreover, the reaction time can be reduced to less than a third of that of the conventional method. Therefore, the present invention is considered to be quite effective industrially and it is possible to effectively synthesize polycrystals of various kinds of compound semiconductors. Furthermore, the resulting polycrystals are homogeneous and excellent in their stoichiometry, in other words, they have no concentration gradient along the crystal growing direction, as is apparent from the construction of the method and the apparatus according to the present invention.

In the light of above teachings, therefore, various modifications and variations of the present invention are contemplated and will be apparent to those skilled in the art without departing from the spirit and scope of this invention.

What is claimed is:

1. An apparatus for manufacturing compound semi-conductor polycrystals from a gaseous first component and a second component in the form of a melt, the first component having a high dissociation pressure, comprising:

a pressure vessel having an interior space and having a top wall and a bottom wall;

an upper shaft inserted hermetically through the top wall of said pressure vessel into said interior space, said upper shaft having a lower extremity situated in said interior space, said upper shaft being adapted to rotate and reciprocate relative to said top wall;

an outer cylindrical member having a closed top wall and being fixed to and supported by the upper shaft;

an inner cylindrical member coaxially supported by the outer cylindrical member and forming with said outer cylindrical member a channel, said inner cylindrical member having a top portion;

a container having a confined space for receiving said first component in said confined space, said container being disposed at the top portion of the inner cylindrical member so as to form a closed top wall thereon, said container communicating with said channel such that the gaseous first component is communicated to and transported by said channel;

a first heater disposed about said container for heating the first component within said container and for maintaining said confined space of said container at a desired pressure;

a lower shaft extending hermetically through the bottom wall of said interior space, said lower shaft being adapted to rotate and reciprocate relative to said bottom wall;

a crucible for receiving said second component, said crucible being fixed to and supported by the lower shaft, said crucible having a side wall and bottom portion; and a second heater provided independently of said first heater and disposed about said side wall and bottom portion of the crucible for heating said crucible to thereby melt the second component, said outer and inner cylindrical members having lower portions of sufficient length so that they are immersed in said melt thereby isolating at least part of the space above the melt surface from the remainder of said interior space, whereby said isolated space communicates with said confined space of said container so that a pressure equilibrium system is realized, with the result that the gaseous first component is resolubilized into the melt, if the pressure in said isolated space exceeds the equilibrium pressure thereby maintaining the pressure of said isolated space at a desired value, and said lower portions of the outer and inner cylindrical members are tapered inwardly in said melt for supplying said first component from said channel into said melt.

2. An apparatus for manufacturing compound semiconductor polycrystals as set forth in claim 1 wherein the outer and inner cylindrical members are integrated into a solid cylindrical member having said container built-in at its top wall and at least one hole is formed within the wall the solid cylindrical member, which communicates the container with said melt.

3. An apparatus for manufacturing compound semiconductor polycrystals as set forth in claim 1 wherein the outer and inner cylindrical members are composed of a material selected from the group consisting of pyrolytic boron nitride, boron nitride, quartz and carbon coated with boron nitride.

4. An apparatus for manufacturing compound semiconductor polycrystals as set forth in claim 1 wherein a porous member is fitted to the open-ended lower extremity of the annular channel formed between the outer and inner cylindrical member and the porous member is composed of a material selected from the group consisting of quartz, pyrolytic boron nitride, carbon, aluminium nitride and silicon nitride.

* * * * *